(12) United States Patent
Hajimiragha et al.

(10) Patent No.: US 9,625,928 B2
(45) Date of Patent: Apr. 18, 2017

(54) SYSTEMS AND METHODS FOR ERROR MONITORING AND HANDLING IN CONTROL SYSTEMS

(71) Applicant: General Electric Company, Schenectady, NY (US)

(72) Inventors: Amirhossein Hajimiragha, Richmond Hill, CA (US); Mohammad Reza Dadash Zadeh, London (CA); Iulian Raducanu, Markham (CA)

(73) Assignee: General Electric Company, Schenectady, NY (US)

( * ) Notice: Subject to any disclaimer, the term of this patent is extended or adjusted under 35 U.S.C. 154(b) by 435 days.

(21) Appl. No.: 14/188,315

(22) Filed: Feb. 24, 2014

(65) Prior Publication Data

US 2015/0241893 A1   Aug. 27, 2015

(51) Int. Cl.
| | | |
|---|---|---|
| *G05F 1/66* | (2006.01) | |
| *H02J 3/38* | (2006.01) | |
| *G05D 11/00* | (2006.01) | |
| *H02J 13/00* | (2006.01) | |
| *H02J 3/28* | (2006.01) | |

(52) U.S. Cl.
CPC ............ *G05F 1/66* (2013.01); *H02J 3/381* (2013.01); *H02J 13/0096* (2013.01); *H02J 3/28* (2013.01); *Y02E 40/72* (2013.01); *Y02P 80/14* (2015.11); *Y04S 10/12* (2013.01)

(58) Field of Classification Search
CPC . G05F 1/66; H02J 13/0096; H02J 3/28; H02J 3/381
USPC .......................................................... 700/297
See application file for complete search history.

(56) References Cited

U.S. PATENT DOCUMENTS

2002/0064010 A1   5/2002   Nelson et al.
2008/0143304 A1   6/2008   Bose et al.
(Continued)

FOREIGN PATENT DOCUMENTS

WO   2013106906 A1   7/2013

OTHER PUBLICATIONS

Jiang et al., "Energy Management of Microgrid in Grid-Connected and Stand-Alone Modes", IEEE, 2013, 10pg.*

(Continued)

*Primary Examiner* — Ryan Coyer
(74) *Attorney, Agent, or Firm* — Parks IP Law LLC; Stephen J. Terrell

(57) ABSTRACT

In a first embodiment, a system for controlling a microgrid includes a processor-based control system. The control system is configured to receive information via a communications pathway from at least one microgrid asset within a microgrid system and identify one or more errors associated with an operation of the microgrid system. In addition, the control system is configured to respond to the one or more identified errors with one or more actions. Each identified error from the one or more identified errors is associated with at least one action from the one or more actions. Further, control system is configured to generate an optimal dispatch schedule having one or more control signals configured to control the microgrid operation to reduce cost and to improve an operational efficiency of the microgrid. The optimal dispatch schedule is based at least in part on the response to the one or more identified errors.

17 Claims, 5 Drawing Sheets

(56) References Cited

U.S. PATENT DOCUMENTS

| | | | |
|---|---|---|---|
| 2009/0062969 A1* | 3/2009 | Chandra | G06Q 10/06 700/291 |
| 2010/0213925 A1 | 8/2010 | Teodorescu et al. | |
| 2011/0248569 A1* | 10/2011 | Son | H02J 3/381 307/87 |
| 2012/0150679 A1* | 6/2012 | Lazaris | G06Q 30/0605 705/26.2 |
| 2013/0168236 A1 | 7/2013 | Zadeh et al. | |
| 2013/0190938 A1 | 7/2013 | Zadeh et al. | |
| 2014/0018969 A1 | 1/2014 | Forbes, Jr. | |

OTHER PUBLICATIONS

Jimeno et al., "Architecture of a microgrid energy management system", Wiley Online, 2011, 17pg.*
Mohamed et al., "Online management genetic algorithms of microgrid for residential application", Elsevier, 2012, 7pg.*
Palma et al., "A Microgrid Energy Management System Based on the Rolling Horizon Strategy", IEEE, 2013, 11pg.*
Sanseverino et al., "An execution, monitoring and replanning approach for optimal energy management in microgrids", Elsevier, 2011, 8pg.*
Sobu et al., "Dynamic Optimal Schedule Management Method for Microgrid System Considering Forecast Errors of Renewable Power Generations", IEEE, 2012, 6pg.*
International Search Report in related PCT/US15/17333 dated May 27, 2015.
GE Digital Energy, "U90 Plus Microgrid Generation Optimization Instruction Manual," GE Multilin Inc., Revision 1.1, pp. 1-140, Sep. 2012.

* cited by examiner

SYSTEMS AND METHODS FOR ERROR MONITORING AND HANDLING IN CONTROL SYSTEMS

BACKGROUND OF THE INVENTION

The subject matter disclosed herein generally relates to optimization of power generation in microgrid control systems, and more particularly to systems and methods for error monitoring and handling in a microgrid control system.

Energy infrastructure, such as a "smart grid" infrastructure, may include power generation systems, power transmission systems, smart meters, digital communications systems, control systems (e.g., central and local controllers), and their related components. In particular, smart microgrid systems may include a plurality of assets, such as power generation sources, loads (e.g., power users or consumers), storage systems or devices, and/or mixed purposed systems or devices. In addition, microgrid systems may be stand-alone power generation and distribution networks, may be individually controllable parts of larger power generation and distribution networks, and/or may be a single facility with its own power generation sources, loads/users/consumers, storage systems/devices, and/or mixed purpose devices/systems.

In smart grid power systems, particularly in microgrid power systems, it is often desirable to control the dispatch of electrical generation, thermal generation, and energy storage in order to reduce operating costs, increase yield, and/or reduce losses concurrently. In some embodiments, such control over the dispatch may be referred to as optimization of the microgrid system. The optimization and control of microgrid systems may be done through optimization-oriented calculations, referred to as optimal dispatch scheduling (e.g., one or more control signals, commands or instructions transmitted to microgrid assets). In order to formulate an optimal dispatch schedule within a microgrid system, a variety of operational constraints and/or limitations are considered, such as, for example, those resulting from various microgrid assets within the microgrid system. Indeed, microgrid optimization and control may generally involve monitoring and commanding the various microgrid assets within the system. In some situations, it may be desirable to identify the different types of errors and/or undesired events that may occur during microgrid optimization and control. Further, it may be desirable to take appropriate action in response to the identified errors to reduce the impact of the errors on or within the microgrid system.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system for controlling a microgrid includes a processor-based control system. The processor-based control system is configured to receive information via a communications pathway from at least one microgrid asset within a microgrid system and identify one or more errors associated with an operation of the microgrid system. In addition, the processor-based control system is configured to respond to the one or more identified errors with one or more actions. Each identified error from the one or more identified errors is associated with at least one action from the one or more actions. Further, the process-based control system is configured to generate an optimal dispatch schedule having one or more control signals configured to control the microgrid operation to improve an operational efficiency of the microgrid. The optimal dispatch schedule is based at least in part on the response to the one or more identified errors. In addition, the process-based control system is configured to deliver at least a portion of the optimal dispatch schedule via the communications pathway to a processor-based local controller associated with the microgrid asset. The operation of the processor-based local controller is based at least in part on the portion of the optimal dispatch schedule.

In a second embodiment, a non-transitory computer-readable medium having computer executable code stored thereon is provided. The code comprises instructions for validating a communications pathway between a control system and a local controller, where the control system is configured to calculate an optimal dispatch schedule to an optimization problem associated with a microgrid operation. The code further comprises instructions for validating a set of data received by the control system from the local controller related to the microgrid operation. In addition, the code comprises instructions for responding via the control system to the one or more identified errors with one or more actions and generating the optimal dispatch schedule comprising one or more control signals configured to control the microgrid operation to reduce cost and improve an operational efficiency of the microgrid. The optimal dispatch schedule is based at least in part on the response to the one or more errors identified.

In a third embodiment, a control system including a processor is provided. The processor is configured to identify one or more errors associated with an operation of the microgrid system and respond to the one or more identified errors with one or more action. Each identified error from the one or more identified errors is associated with at least one action from the one or more actions. The processor is also configured to generate an optimal dispatch schedule comprising one or more control signals configured to control the microgrid operation to improve an operational efficiency of the microgrid. The optimal dispatch schedule is based at least in part on the response to the one or more identified errors.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
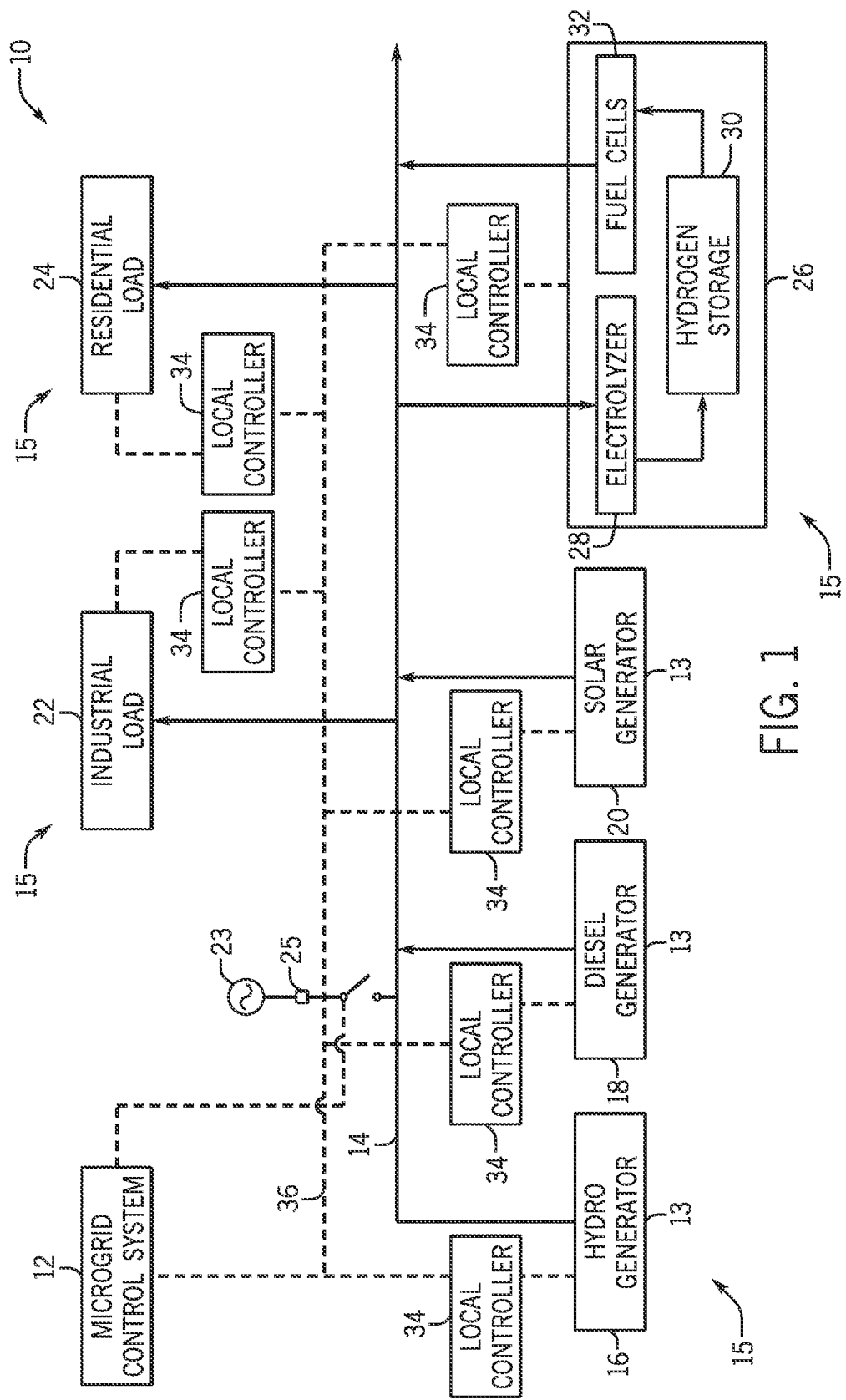
FIG. 1 is a schematic diagram illustrating an embodiment of a microgrid system according to embodiments described herein.

One or more specific embodiments of the present invention will be described below. In an effort to provide a concise description of these embodiments, all features of an actual implementation may not be described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As noted above, optimal dispatch scheduling may be used to optimize and control microgrid systems having one or more operational constraints and/or limitations. For example, optimization and/or control of the microgrid system includes dispatching one or more control signals, commands or instructions in a manner that increases yield, reduces losses, and/or reduces operating costs. The operational constraints and/or limitations may include microgrid assets such as power generation sources, loads, storage systems or devices, and/or mixed purposed systems or devices. In particular, a microgrid control system may be used to optimize a microgrid system by controlling one or more local controllers associated with each microgrid asset within the system. For example, in some situations, formulating an optimal dispatch technique for the microgrid system in view of these constraints and/or limitations may involve reading from the microgrid assets, calculating one or more optimization-oriented problems, writing one or more optimal decisions/commands to local controllers, and implementing the decisions/commands by the local controllers. In particular, the optimal decisions/commands transmitted to the local controllers are control signals that may control the each component of the microgrid and/or the overall operation of the microgrid.

During any one of these phases (e.g., reading, optimizing or calculating, writing, implementing), some errors and/or undesired events may arise and may impact the optimal and stable operation of the microgrid system. Errors or undesired events within a microgrid system may include, for example, a microgrid control system being unable to establish communication with the local controller of an asset, an offline asset not responding to an "ON" command from the microgrid control system, an online asset not responding to an "OFF" command from the microgrid control system, an offline asset becoming online without receiving an "ON" command from the microgrid control system, or an online asset becoming offline without receiving an "OFF" command from the microgrid control system (e.g., failure). Other errors or undesired events within the microgrid system include a microgrid control system that is unable to change the operation mode of an asset (e.g., changing the operation mode of a dispatchable generator from droop to isochronous or changing the operation mode of a storage device from constant power to load following), or a microgrid control system that is unable to formulate and solve the optimization problem (e.g., efficient control of power generation of the power generation sources 13) within the microgrid system.

As such, it may be desirable to provide a microgrid control system configured to monitor the microgrid system (e.g., microgrid assets) during execution of the optimal dispatch technique. In particular, it may be desirable to provide for a microgrid control system that identifies the different types of errors and/or undesired events that may occur during the phases (e.g., reading, optimizing, writing, implementing) of the dispatch scheduling technique. Further, it may be desirable to handle and take appropriate action in response to the identified errors to reduce the negative impact of the errors on the microgrid system's operations and stability. Indeed, such error monitoring and handling procedures may be implemented within the microgrid control system, as will be described in detail below.

With the forgoing in mind, FIG. 1 is a schematic diagram illustrating an embodiment of a microgrid system 10, including a microgrid control system 12. In particular, the microgrid 10 includes various devices or microgrid assets 15, such as, for example, power generator sources 13 (e.g., renewable generators, dispatchable generators, etc.), storage devices, and/or loads (e.g., users/consumers). Transmission lines 14 may connect the various devices or assets within the microgrid 10, and may be used as power pathways and/or communications pathways. It should be understood that transmission lines 14 represent a distribution network for microgrid 10 and may include multiple sections/segments and/or substations as may be desired and/or appropriate.

In the illustrated embodiment, the microgrid 10 may include various power generator sources 13 such as, for example, a hydro generator 16, a diesel generator 18, and a solar generator 20. In other embodiments, the microgrid 10 may include other forms of dispatchable, non-dispatchable, or renewable power generation sources, such as, for example, combined heat and power generators or wind turbines. Power produced by these power generation sources may be delivered via the transmission lines 14 to loads within the microgrid 10. For example, in the illustrated embodiment, power produced by the hydro generator 16, the diesel generator 18, and/or the solar generator 20 may be delivered via transmission lines 14 to an industrial load 22 or a residential load 24. In other embodiments, the produced power may be delivered via the transmission lines 14 to other loads, such as a municipality (e.g., one or more houses, residential areas, buildings, cities, etc.), a vehicle charging system, and/or a commercial facility (e.g., one or more stores, manufacturing plants, commercial districts, etc.). In certain embodiments, the microgrid 10 may be coupled to a main grid 23 (e.g., utility) through a breaker at a point of common coupling 25 (e.g., PCC 25).

In addition, one or more storage devices 26 within the microgrid system 10 may draw power from the power generation sources 13 via the transmission lines 14. The storage device 26 may be used to store power generated by the power generation sources 13 (e.g., hydo generator 16, diesel generator 18, or solar generator 20), and such stored power may be used when power is needed but is not readily available, such as during power outages, when excess demand is present, and so forth. In the illustrated embodiment, the storage device 26 includes an electrolyzer 28, hydrogen storage 30, and one or more fuel cells 32 (e.g., fuel modules, fuel stacks, etc.). The electrolyzer 28 may use generated power (e.g., electricity) to generate hydrogen and create byproducts such as heat and oxygen. The generated hydrogen may be compressed and stored within the hydrogen storage 30, and may be used by the fuel cells 32 to generate electricity at any time. The fuel cells 32 may be used to supply power to the microgrid 10 via the transmission lines 14 when desired. In other embodiments, the storage device 26 may be one or more batteries or other energy storage devices/assets that are present as part of one or more energy storage systems.

The microgrid 10 may also include one or more local controllers 34 (e.g., control units, control subsystem, etc.) communicatively connected to the microgrid control system 12 via the communications pathway 36. The communications pathway 36 may include a wired network connection, a wireless network connection, and/or any form of connection suitable for receiving information from the microgrid assets 15 (e.g., the hydro generator 16, the diesel generator 18, the solar generator 20, the industrial load 22, the residential load 24, or the storage devices 26) as well as transmitting commands from the microgrid control system 12 to the local controllers 34. When the communications pathway 36 includes wireless communication elements, the wireless network connections may include a wireless access point to which any device within the microgrid 10 may wirelessly and communicatively connect to the communications pathway 36. In addition, the communications pathway 36 may be connected to or may be a part of a larger communication pathway 36, such as the internet, a private computer network, or the like.

In particular, the microgrid control system 12 may receive information from and transmit instructions (e.g., commands, decisions, control signals, etc.) to the local controllers 34, where each local controller 34 is communicatively coupled via the communications pathway 36 to a microgrid asset 15. Indeed, each local controller 34 may be configured to control various aspects of the microgrid system for which it is responsible for (e.g., a corresponding microgrid asset 15), and may additionally be responsible for relaying information from the microgrid asset 15 to the microgrid control system 12. In this manner, the microgrid control system 12 may be configured to provide optimal dispatch scheduling (e.g., instructions, control signals, commands, etc. that provide the optimal control of the microgrid) to optimize and control the microgrid assets 15, such as, for example, the hydro generator 16, the diesel generator 18, the solar generator 20, the industrial load 22, the residential load 24, or the storage devices 26. In addition, the microgrid control system 12 may receive information from and/or send information to external sources through the communications pathway 36, such as for example, meteorological/climate information, a usage history information, and so forth.

Figure 2:
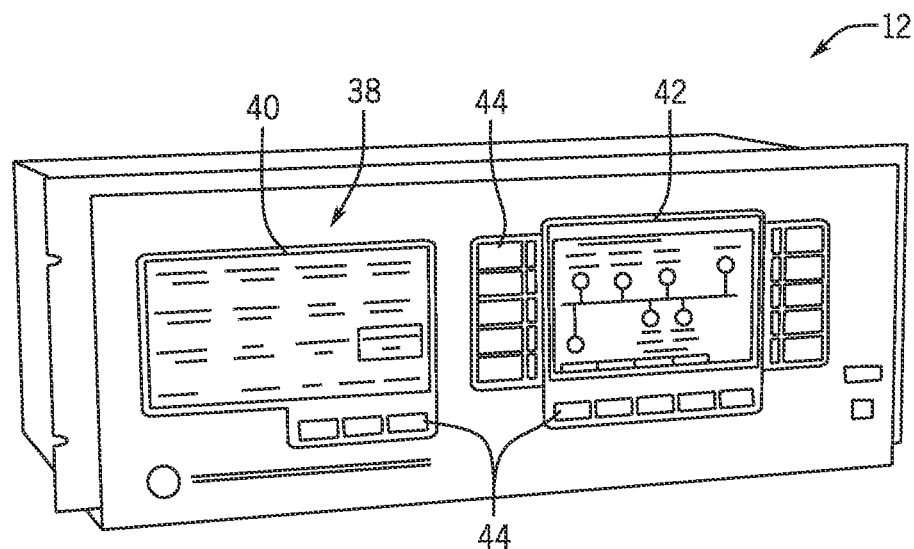
FIG. 2 is an illustration of an embodiment of a front panel of the microgrid control system, including an annunciator display and a human-machine interface (HMI) display.

In some embodiments, the microgrid control system 12 may include one or more interfaces for receiving input from a user. FIG. 2 is an illustration of an embodiment of a front panel 38 of the microgrid control system 12 that allows for user input. The microgrid control system 12, as illustrated, includes an annunciator display 40 and a human-machine interface (HMI) display 42. As described with respect to FIG. 1, the microgrid control system 12 may be configured to generate and solve an optimal dispatch problem for the microgrid 10 in view of the microgrid assets 15, and may involve reading from the microgrid assets 15, calculating one or more optimization problems for the microgrid 10, and writing one or more optimal instructions (e.g., decisions, commands, etc.) to efficiently control and/or regulate the local controllers. Accordingly, it may be desirable to visualize the operations of the microgrid control system 12 through the front panel 38, and interact with a user/operator.

The annunciator display 40 may be configured to indicate alarms and/or product information related to functions or operations within the microgrid 10. In certain embodiments, an alarm indicated by the annunciator display 40 may correspond to one or more types of errors and/or undesired events that may occur during the phases (e.g., reading, optimizing, writing, implementing) of the dispatch scheduling process or technique. The alarm conditions may be preset through user inputs, or may be preconfigured within a memory of the microgrid control system 12. For example, configuring an alarm may involve selecting the boundaries of when an alarm may alert an operator in response to a particular error or undesired condition. Further, control buttons 44 at the bottom of the annunciator display 40 may be used to change the viewing (display of) and turn off alarms on the front panel 38. In certain embodiments, the control buttons 44 may be used to turn off an alarm, cycle through active alarms, view additional information about an alarm (e.g., description and/or location of undesired error or event), and so forth.

The HMI display 42 of the microgrid control system 12 may be used to provide status information (e.g., time until next optimal dispatch communication, online or offline status of microgrid assets 15, etc.), electrical system information (e.g., energy generated by each power generation source, power output, capacity of microgrid system 10, amount of energy stored within storage devices 26, etc.), historical information (e.g., previous optimal dispatch instructions, historical statistics on microgrid assets 15, etc.), and generally any form of information related to a microgrid control system 12 an operator may desire. In particular, the HMI display 42 may be used to set calculation parameters used to determine the optimal dispatch schedule. For example, the predefined time over which optimization is performed for the microgrid 10 may be provided through user input via the HMI display 42. Indeed, the HMI display 42 may be configured to display graphically the status of the optimization calculations, such as, for example, a progress bar indicating the progress made within each cycle of optimal dispatch scheduling. Further, control buttons 44 may be used to navigate and select through different subsystems and assets and various options on the HMI display 42.

Figure 3:
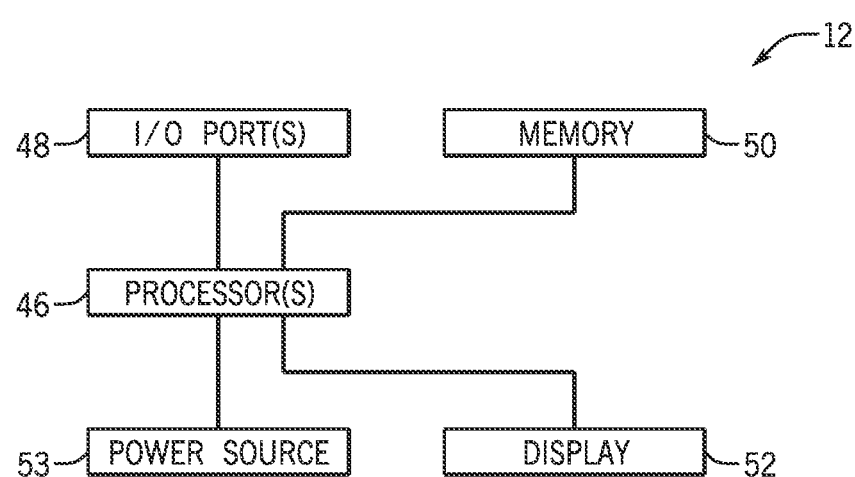
FIG. 3 is a schematic diagram illustrating an embodiment of the microgrid control system including one or more processors, an input/output (I/O) component, and a memory component.

Turning to FIG. 3, schematic diagram illustrating an embodiment of the microgrid control system 12 including one or more processors 46, an input/output (I/O) component 48, and a memory component 50. In particular, the processor 46 may be associated with the memory component 50 (e.g., tangible, non-transitory memory component 50) that allows for the storage of machine-readable instructions, such as, for example, an executable program code configured to solve a microgrid optimization problem to increase efficiency of the microgrid 10. The processor 46 is configured to execute the program code while processing external information, such as, for example, information read from microgrid assets 15 within the microgrid system 10, information received through the I/O component 48 from an operator, and so forth. For example, the I/O component 48 may include one or more human I/O devices (e.g., keyboard, mouse, etc.), which allow an operator/user to interact with the microgrid control system 12 and/or the microgrid optimization executable program, as further described below. Indeed, as noted above, a display 52 (e.g., the annunciator display 40 or the HMI display 42), may be used to relay and convey information derived from the microgrid assets 15 or the processor(s) 46 to the operator. Moreover, the components described within the microgrid control system 12 may be powered by the power source 53, such as, for example, one or more batteries, a wall outlet, and so forth.

In particular, the one or more processors 46 of the microgrid control system 12 may execute program code, such as program code configured to formulate and solve the microgrid optimization problem and to provide an optimal dispatch schedule for the microgrid 10 to efficiently control and/or regulate the microgrid 10 assets. The microgrid optimization program may be configured to manage and process information derived from the microgrid 10 or through user input from the I/O ports 48. For example, the microgrid optimization program may involve storing information in the memory component 50, retrieving information and/or historical statistics from the microgrid assets 15, manipulating and organizing collected information, creating and writing an optimal dispatch schedule (e.g., instructions, commands, or decisions) for the assets and/or the local controllers 34 of the microgrid 10, presenting information to an operator via a display 52, and so forth. Operation of the microgrid control system 12 may generally occur in various modes of operation, such as an Off mode, an Advisory mode, or an Auto mode. During the Off mode, the microgrid optimization problem may not be solved and thus, the communication of the optimal dispatch schedule (e.g., optimal dispatch solution) may not take place between the microgrid control system 12 and the local controllers 34. In the Advisory mode, the microgrid optimization problem may be solved, but the optimal dispatch schedule (e.g., optimal dispatch solution) may not be communicated with the local controllers 34. In the Auto mode, the microgrid optimization problem may be solved and the optimal dispatch schedule (e.g., solution) is communicated with the local controllers 34.

Further, the microgrid control system 12 may communicate with the local controllers 34 to receive information or to provide a series of commands or instructions (e.g., optimal dispatch scheduling via one or more control signals). For example, the local controllers 34 may provide binary and/or analog input data to the microgrid control system 12. In particular, the local controllers 34 may provide information related to the availability of the microgrid asset 15 to the control system 12. Availability may be a binary signal that relates to the availability of the asset 15 to take part in the calculations performed by the control system 12 to formulate and solve the microgrid optimization problem and to provide an optimal dispatch schedule for the microgrid 10. An available asset may be included in the decision-making process of the control system 12, and may be capable of receiving various commands or instructions, as further explained below. An unavailable asset may be excluded from the decision-making process of the control system 12. The binary signal related to the availability of the asset 15 may be based on a logic-based calculation within a local controller. For example, the availability of the asset 15 may be the logical AND of the following conditions: the asset 15 is in auto mode (e.g., the asset 15 can be automatically started and commanded by the control system 12), no incomplete start has occurred, no incomplete stop has occurred, and a protection trip has not been activated. In certain embodiments, a user/operator may exclude or include one or more assets 15 from the decision-making process of the control system 12. The control system 12 may be configured to enable or disable the asset 15 with a binary signal from the user/operator. For example, it may be beneficial to disable the asset 15 during setup of the control system 12 when the asset 15 cannot be in service for an extended period of time (e.g., maintenance). In particular, the control system 12 may calculate the logical AND of availability and enable for each asset 15 in order to determine whether the asset 15 is included within the decision-making process. In certain embodiments, the control system 12 may be configured to overwrite the availability or enable of each asset 15 for certain error handling procedures, as will be explained further below.

The microgrid control system 12 may also communicate with the local controllers 34 to provide a series of commands or instructions (e.g., optimal dispatch scheduling via one or more control signals), such as, for example, Start/Stop, Power Setpoints, Isochronous/Fast Load-Following, Watchdog, Operation Mode, and so forth. The Start/Stop command may be used to determine the optimal combination of online and offline assets and/or devices in the microgrid 10. The Power Setpoints may be used to determine the optimal power generation levels for dispatchable power generation units (e.g., 16, 18, etc.), and the storage devices 26. The Isochronous/Fast Load-Following command may be used to determine which microgrid asset 15 may be operating in Isochronous/Fast Load-Following mode to provide reserve margin and maintain a consistent frequency in the microgrid 10. In some embodiments, the governor of the isochronous machine selected by the microgrid control system 12 adjusts the energy applied to the prime mover to maintain a fixed frequency regardless of the load up to the rated power of the machine. The similar command sent to a storage device can put it in the fast load-following mode to catch the swings in load and renewable powers, thus facilitating the stable operation of the microgrid. The Watchdog command may be used to inform the local controllers 34 that communication to the microgrid control system 12 is healthy. The Operation Mode command may be used to inform the local controllers 34 of the operation mode of the microgrid control system 12 (i.e., Off, Advisory, Auto).

During operation of the microgrid control system 12, execution of the microgrid optimization program code to increase efficiency of the microgrid 10, or creation or transmittal of the optimal dispatch scheduling, errors or undesirable events may generally occur. For example, in the control framework of the microgrid 10, communication between the microgrid control system 12 and the local controllers 34 may not be established, or may be interrupted, disabled, intercepted, miscommunicated, and so forth. These errors may be classified into the following five general categories, unobservability, uncontrollability, failure, infeasibility, and unboundedness, as will be further discussed with respect to FIG. 5. Accordingly, it may be desirable to enable the microgrid control system 12, and more specifically the processor(s) 46, to identify various types of errors and handle the identified errors.

In some embodiments, the error monitoring/identification and handling may occur as a set of instructions within the microgrid optimization program code. In other embodiments, the error monitoring/identification and handling may occur with a separate set of instructions stored within the memory component 50, such as with an error monitoring and handling program code executed by the processor(s) 46. Indeed, a microgrid control system 12 configured to identify and handle errors and/or undesired events may mitigate and minimize the detrimental effect of such errors and/or undesired events on the stable and optimal operation of the control system 12 and the microgrid 10.

Figure 4:
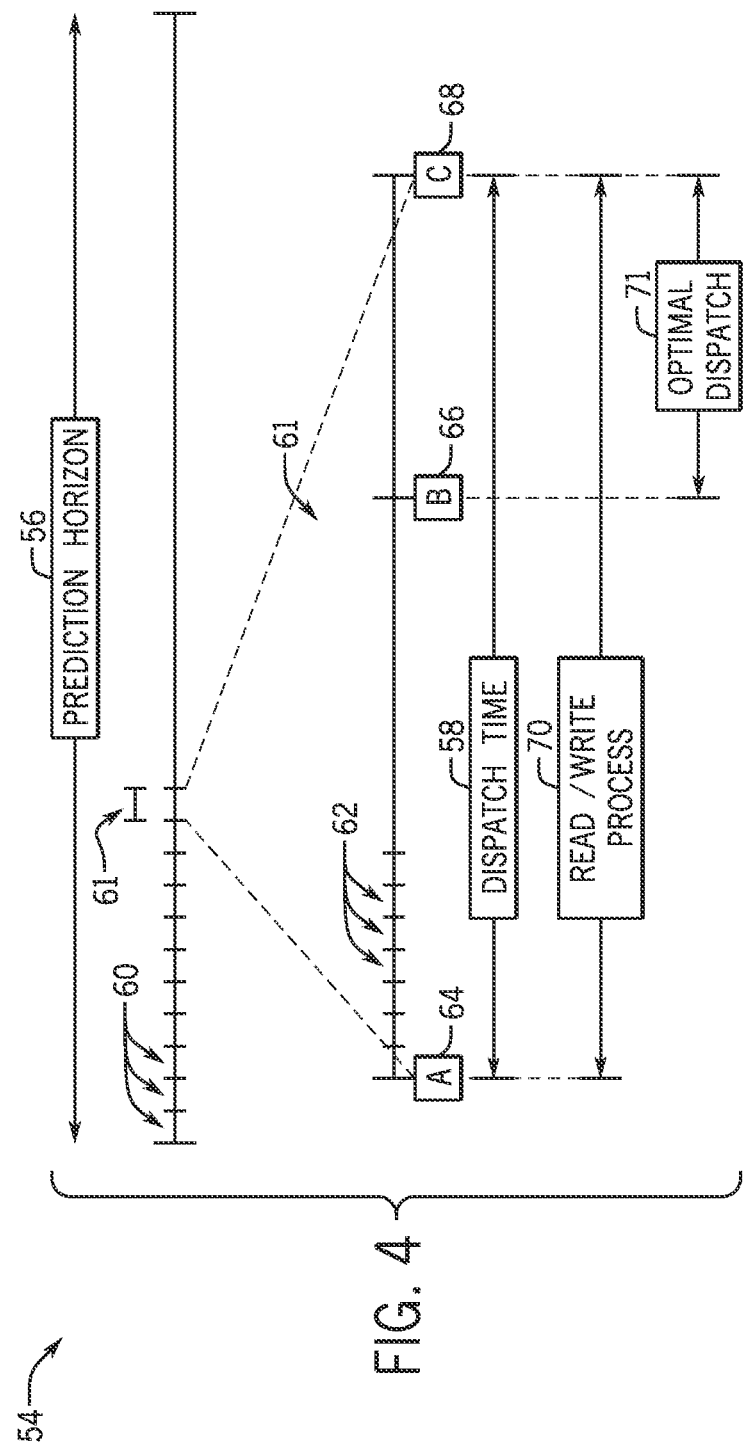
FIG. 4 is a visualization of an embodiment of an optimal dispatch schedule executed by the microgrid control system, depicting a prediction horizon, a dispatch time, and a multi-time-interval nature of the microgrid optimization problem.

FIG. 4 is a visualization of an embodiment of an optimal dispatch process 54 executed by the microgrid control system 12, depicting a prediction horizon 56 and a dispatch time 58. As described above, the microgrid 10 employs the microgrid control system 12 to calculate one or more optimization-oriented problems based on limitations/constraints created by microgrid assets 15, write one or more optimal decisions/commands/instructions to local controllers 34 in an optimal dispatch schedule 54 to control and/or regulate the local controller 34 in an efficient manner, and implement the optimal dispatch process 54 by the local controllers 34. With this optimization functionality, the control system 12 determines the optimal operation of the microgrid assets 15 within a microgrid 10 to achieve a minimum objective function, such as total operating costs over a prediction horizon 56.

The prediction horizon 56 is a predefined period of time over which optimization of the microgrid system 10 is to be performed. Further, each prediction horizon 56 may be composed of time intervals 60, which is a predefined time resolution of optimization that indicates how often optimization and/or optimization calculations are to be performed during the prediction horizon 56. As an example, the time interval 60 may be a predetermined time between about 45 and 60 minutes, 30 to 45 minutes, 20 to 30 minutes, 15 to 20 minutes, 10 to 15 minutes, 1 to 10 minutes, and so forth. Indeed, any other pre-determined time intervals may be used, such that the pre-defined period of time is a sufficient length of time for the optimization of the microgrid 10 (e.g., calculation of the optimization problem). The prediction length is the number of time intervals 60 for which optimization is to be performed and may be obtained by dividing the prediction horizon 56 by the time interval 60. Thus, for a 24-hour prediction horizon 56 and a 12-minute time interval 60, the prediction length is 120 time intervals 60. In certain embodiments, a time step 61 (e.g., "t") may be used as an index and may vary from 1 to the prediction length, where 1 is the present time step 61. For example, in the illustrated embodiments, the time step 61 is the present time interval 60, and is 12 minutes in length.

In some embodiments, the time step 61 may be further divided into time windows with time markers at various points on the time step 61. For example, a time point A 64, a time point B 66, and a time point C 68 are used to outline the boundaries of various time windows within the time step 61, such as the AB window (e.g., from time point A 64 to time point B 66) and the BC window (e.g., from time point B 66 to time point C 68). The length of the time windows AB and BC may be decided based on a variety of factors within the microgrid system 10, such as for example, the type and number of microgrid assets 15 and the complexity of the microgrid 10 operational constraints and/or limitations. Likewise, the length of other time intervals within the optimal dispatch process 54, such as, for example, the time intervals 60 or the time step 61, may also be determined based on a variety of factors within the microgrid system 10, such as the type and number of microgrid assets 15. In certain embodiments, any time interval within the optimal dispatch process 54, including the prediction horizon 56, may be determined through user input via the I/O ports 48.

Through out the time step 61 (e.g., continuously in both the AB time window and the BC time window), the microgrid control system 12 reads information from the microgrid assets 15 and writes commands/instructions to the microgrid assets 15 in a read/write process 70. The read/write process 70 may occur over a time interval 62, such as at every 10 seconds, 20 seconds, 30 seconds, and so forth. In particular, at time point B 66, the information or data (e.g., information read from the microgrid assets 15) collected during the AB time window are latched and a data file may be formed and stored within the memory component 50. This data file may be used by the microgrid control system 12, and more specifically, accessed by the processor 46 executing the microgrid optimization program code, to calculate the microgrid optimization schedule in the BC time window during the optimal dispatch process 71. The optimal solution to the optimization problem may be concluded at time point C 68, and an optimal dispatch schedule (e.g., instructions, commands, or decisions) are communicated with the microgrid assets 15 via the communications pathway 36. In this manner, new commands will be communicated with the microgrid assets 15 every few seconds (e.g., 10 seconds) until a new optimization problem is generated by the processor 46 and solved within the next time step 61. In short, in certain embodiments, the microgrid control system 12 includes two relatively fast and slow processes: the fast read/write process 70 occurring every few seconds (e.g., 10 seconds), and the slow optimization problem occurring every few minutes/hours over the time step 61 (e.g., 12 minutes). As illustrated in FIG. 4, both the read/write process 70 and the optimal dispatch process 71 occur over the same time window (e.g., time window BC) within the present time step 61. In certain embodiments, however, the optimal dispatch schedule transmitted at time point C 68 is based only on the latched data collected and stored into the data file at time point B 66.

As noted above, operation of the microgrid control system 12 may generally occur in a various modes of operation, such as an Off mode, an Advisory mode, or an Auto mode. Accordingly, the execution of the optimal dispatch process 71, and particularly the dispatch of instructions, commands or decisions at time point C 68, may depend upon the operation mode of the microgrid control system 12. For example, during the Off mode, the microgrid optimization problem may not be solved and no communication of commands or instructions may take place between the microgrid control system 12 and the local controllers 34. In this mode of operation, the optimal dispatch process 71 may not occur, since no dispatch schedule is established between the microgrid control system 12 and the local controllers 34 for the transmittal of commands. Indeed, the process of data file generation at time point B may not occur, and the optimization problem may not be initiated by the processor 46 (e.g., microgrid optimization program code may not be accessed within the memory component 50 or executed by the processor 46). In some embodiments, the read process may continue between the microgrid control system 12 and the microgrid assets 15 independent of the mode of operation. For example, in such embodiments, even when the microgrid control system 12 switches to an Off mode, the read process continues while the write process is stopped. The data collected in this manner may be stored in the memory component 50, and may be accessed at a later time for the microgrid optimization process 54.

During normal operation of the microgrid optimization process 54, certain errors and/or undesired events may arise within the microgrid control system 12. As described above, it may be desirable to monitor the processes of the control system 12 to identify these errors, and may further be desirable to handle the identified errors, as is explained further with respect to FIG. 5.

Figure 5:
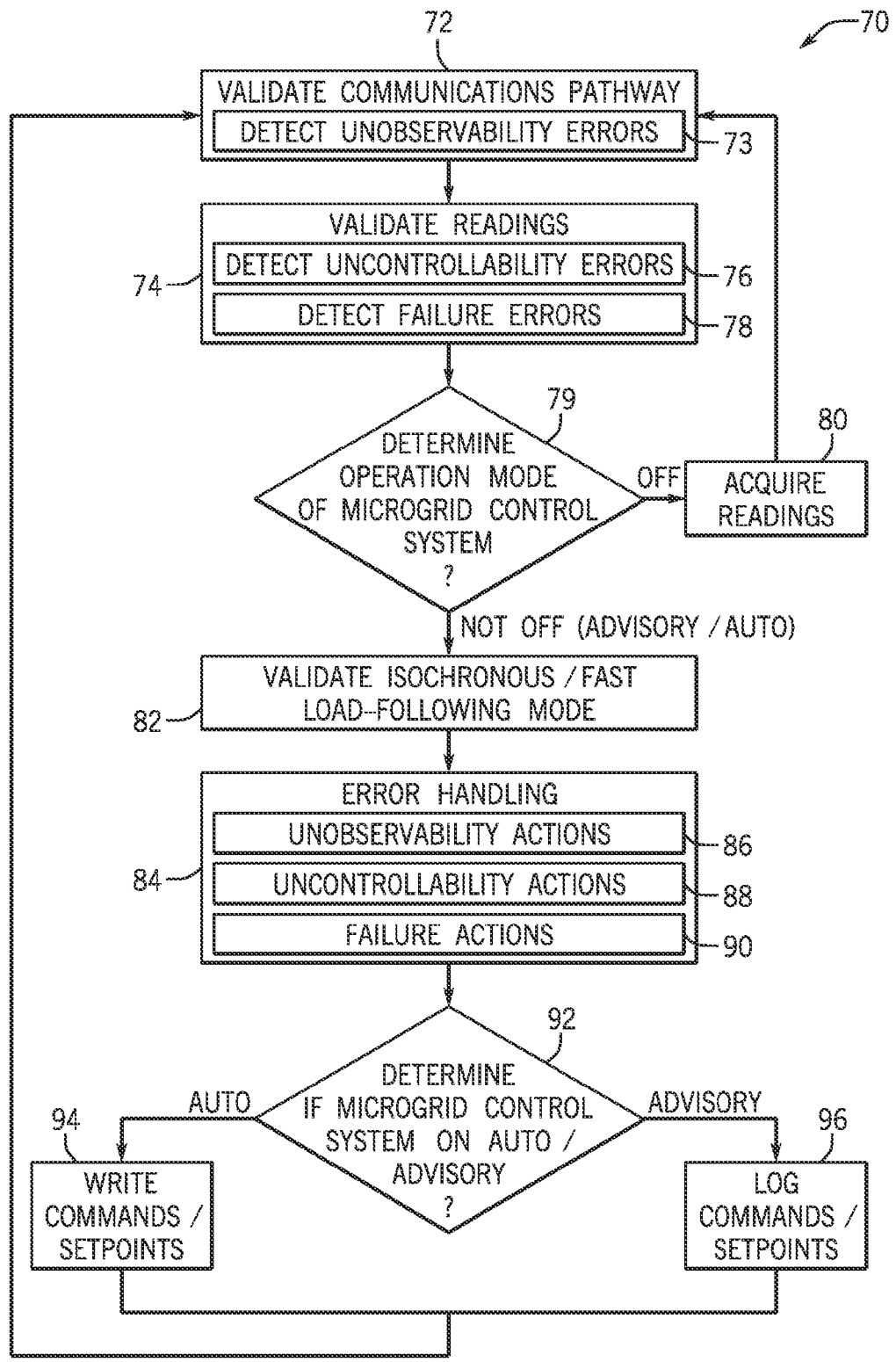
FIG. 5 is a flow chart depicting an embodiment of a process for monitoring the microgrid control system, detecting errors and/or undesirable events, and handling the identified errors and/or undesirable events.

FIG. 5 is a flow chart depicting an embodiment of a process 70 for monitoring the microgrid control system 12, detecting errors and/or undesirable events, and handling the indentified errors and/or undesirable events. During the normal operation of microgrid optimization process 54, errors and undesired events that arise may be classified into five general categories: unobservability, uncontrollability, failure, infeasibility, and unboundedness. The unobservability error refers to the loss of communication, such as the loss of communication between the control system 12 and the local controllers 34. The uncontrollability error refers to an unsuccessful attempt in turning on/off a device (e.g., microgrid assets 15 within the microgrid 10), changing the operation mode of the microgrid asset 15 (e.g., changing the operation mode of a diesel generation set from droop speed control to isochronous speed control), undesired activation of the local controllers 34 or experiencing a large discrepancy between the commands and actual readings from the microgrid 10. The failure error is referred to the case when an online device (e.g., microgrid asset 15) becomes offline due to any reason except for receiving the OFF command from the control system 12. For example, the failure error may occur when the mode of operation of a diesel generator is changed from droop speed control to isochronous speed control. The infeasibility and unboundedness errors correspond to the optimization problem generated and solved during the time window BC, as depicted in FIG. 4, which may lead to unacceptable results. In particular, the unobservability, uncontrollability, failure, infeasibility, and unboundedness errors may include different types or may be defined differently for the different types of microgrid assets 15.

The microgrid control system 12 may be configured to continuously and/or at set intervals monitor these errors and initiate an appropriate action in response to the identified errors to minimize the detrimental effects of these errors on the stability and optimal operation of the microgrid 10. In particular, the process 70 of monitoring and handling the errors may be overlapped and/or embedded within the read/write process 70 of the microgrid optimization process 54. As such, the method 70 may cyclically occur throughout the time step 61, the time intervals 60, the prediction horizon 56, and generally throughout the entire microgrid optimization process 54.

With the forgoing in mind, the process 70 begins with validating the communications pathway 36 (block 72). As noted above, the communications pathway 36 may include a wired network connection, a wireless network connection, and/or any form of connection suitable for receiving information from the microgrid assets 15 (e.g., the hydro generator 16, the diesel generator 18, the solar generator 20, the industrial load 22, the residential load 24, or the storage devices 26) and transmitting the optimal dispatch schedule at time point C 68 from the microgrid control system 12 to the local controllers 34. As the communications pathway 36 is validated, the control system 12 may monitor and detect unobservability errors (block 73). In some embodiments, there are two types of unobservability errors that may be detected at this stage. Unobservability type I refers to the loss of communication between the control system 12 and a device or microgrid asset 15, which is monitored offline before loss of communication. Unobservability type II refers to the loss of communication between the control system 12 and a device or microgrid asset 15, which is monitored online before loss of communication. While two types of unobservability errors are described, it should be noted that any number of unobservability errors may be detected or monitored for depending on the different types of microgrid assets 15 operating within the microgrid 10.

Upon validating the communications pathway 36, the control system 12 may communicate with the microgrid assets 15, and specifically, may read information from the microgrid assets 15. The information read from the microgrid asset 15 may include performance history or historical statistics of the assets 15, the amount of power generated by the assets 15, the amount of energy transmitted, stored, or received by the assets 15, the operating mode or status of the assets 15, and so forth. Accordingly, the method 70 then includes validating the readings collected from the microgrid assets 15 (block 74). During this validation process, the control system 12 may be configured to monitor and detect various types of uncontrollability and failure errors. In some embodiments, there are five types of uncontrollability errors that may be detected by the control system 12 (block 76). Uncontrollability type I refers to the case when an online device receives OFF command from the control system 12 but it does not turn off. Uncontrollability type II refers to the case when an offline device receives ON command from the control system 12 but it does not turn on. Uncontrollability type III refers to an unsuccessful attempt in changing the operation mode of a device or asset. For example, the diesel generator 18 keeps receiving the command from the control system 12 every 10 seconds to be in the isochronous operation mode, but this does not happen. Uncontrollability type IV corresponds to a case when discrepancy between the reference power commands and the corresponding actual readings from the microgrid 10 exceeds a certain level. Uncontrollability type V refers to undesired activation of the local controllers 34 when control system 12 is not in Auto operation mode. In such situations, the write process (e.g., optimal dispatch process 71) or communication of optimal commands with the local controllers 34 takes place only when the control system 12 is in Auto mode. As such, operation of the local controllers 34 when the control system 12 is in Off or Advisory modes is not expected. While five types of uncontrollability errors are described, it should be noted that any number of uncontrollability errors may be detected or monitored for depending on the different types of microgrid assets 15 operating within the microgrid 10.

Further, during validation of the readings collected from the microgrid assets 15 via the communications pathway 36, the control system 12 may be configured to monitor and detect various types of failure errors (block 78). In some embodiments, there are five types of failure errors, and these errors may be different or may be defined differently for the various types of microgrid assets 15. For example, the failure of a dispatchable generation set refers to the case when a dispatchable generation set (e.g., the diesel generator 18) was online at a past time and is commanded by the control system 12 to be online at a future time, but it is offline at that future time. The failure of a storage device refers to the case when the storage device 26 was online at a past time, commanded to be online at a future time, but it is offline at that future time. The failure of a renewable generation set is referred to the case when an enabled renewable generation set was online at a past time, and it is offline at a present time. The failure or tripping of a load is referred to the case when an enabled load was online at a past time, and it is offline at a current time. The failure of the grid 23 for microgrid 10 (if it has a connection to the bulk grid 23) is referred to the case when the enabled grid 23 was online at a past time, and it is offline at a present time. While five types of failure errors are described, it should be noted that any number of failure errors may be detected or monitored for depending on the different types of microgrid assets 15 operating within the microgrid 10.

Upon successful validation of the communications pathway 36 and the readings, the method 70 may determine the mode of operation for the microgrid control system 12 (block 79). For example, the method 70 may determine if the control system 12 is in Auto mode, an Advisory mode, or in an Off mode. If the control system 12 is in an Off mode, additional readings are collected from the microgrid system 10 and the microgrid assets 15. These readings (e.g., historical information on the operation of the microgrid assets 15) may be stored within the memory component 50 for future use in solving the microgrid optimization problem. Furthermore, upon acquiring additional readings from the microgrid, the control system 12 may be configured to revalidate the communications pathway and the collected readings, so that errors may be monitored and detected as necessary.

If the control system 12 is determined to be in the Auto mode or in the Advisory mode, the control system 12 is configured to validate the isochronous/fast load-following mode of operation (block 82). In certain embodiments, validating the isochronous/fast load-following mode of operation may involve determining if the control system 12 and the local controllers 34 are operating in the same mode of operation. Accordingly, if the source (control system 12) and the target (local controllers 34) are synchronized, then the optimal dispatch schedule (e.g., commands, instructions, or decisions) may be transmitted between the two.

Upon validating the isochronous/fast load-following mode of operation, the control system 12 may be configured to handle the previously identified errors or undesirable events through various error handling procedures (block 84). For example, for any unobservability errors detected by the control system 12 (block 73), error handling procedures are initiated by the control system 12 to respond to the identified unobservability errors (block 86). In particular, the control system 12 responds and/or handles the identified errors to generate an optimal dispatch schedule that is optimized for the microgrid system 10 in view of the identified errors (e.g., takes into account the errors in generally a new dispatch schedule). With the forgoing in mind, brief descriptions on how the control system 12 responds to or handles identified errors are provided.

As noted above, an unobservability type I error refers to the loss of communication between the control system 12 and a device or microgrid asset, which is monitored offline before loss of communication. In handling unobservability type I errors, assuming that the communication is lost between the time point A 64 and the time point B 66, this error is checked either continuously or at an interval, for example, every 10 seconds. If the device or asset is still unobservable by the time data are latched for the execution of the next optimal dispatch (time point B 66), the device will be made internally unavailable for use in an optimization calculation by the control system 12. Also, if input/output of a storage device 26 becomes an unobservable type I error, the storage input/output becomes unavailable. Apart from input and output unobservability, the other complication of storage devices 26 is related to the unobservability of the state-of-charge (SOC). In this case, if storage SOC becomes unobservable, both input and output of the storage 26 may become unavailable. The above-discussed action excludes the unobservable microgrid asset 15 from the optimization calculations.

If this microgrid asset 15 is remained available, it may be committed by optimal dispatch 71 which is an undesired situation; that is, a microgrid asset 15 is committed but it cannot be communicated. This may also lead to an uncontrollability error. Hence, instead of waiting for the uncontrollability error handling (block 88) to address the issue, the unobservable microgrid asset 15 is taken out of the optimization problem to more rapidly limit the consequences of this error. If communication with an offline microgrid asset 15 is lost during the time the control system 12 is searching for an optimal solution in the time window BC, an undesirable outcome is to have this unobservable microgrid asset 15 within the optimal solution, and commanded at the time point C 68. Due to loss of communication, this microgrid asset 15 cannot be turned on, which leads to Uncontrollability type II errors, which may be handled by a corresponding error handling procedure, as described below.

The microgrid control system 12 may indentify and handle the detected unobservability type II errors differently than detected unobservability type I errors. Assuming that the communication is lost between the time point A 64 and the time point B 66, the unobservability error is checked continuously or at an interval, for example, every 10 seconds. If by the time data are latched and a new optimization problem is generated and solved (e.g., at the time point B 66) the microgrid asset 15 is still an unobservable type II error, the control system 12 may be transferred to the Advisory mode. As noted above, during the Advisory mode, the microgrid optimization problem may be solved, but the optimal dispatch schedule (e.g., optimal dispatch solution) may not be communicated with the local controllers 34.

In certain embodiments, if communication with an online microgrid asset 15 is lost between the time point B 66 and the time point C 68, and the control system 12 is searching for an optimal solution, the following outcomes for the Unobservable microgrid asset 15 are foreseen at time point C 68 when a new optimal solution is available. For example, there may be no change in the setpoint, and no special action is required, thus the control system 12 continues to operate properly. There may be an increase/decrease in the power setpoint, where either of these two actions cannot be achieved due to loss of communication and it is assumed that the resulting excess/deficit of power is compensated by the isochronous machine or storage device in the microgrid 10. There may be a turn off situation where due to loss of communication, the microgrid asset 15 cannot be turned off. This leads to uncontrollability type I, and it will be addressed based on the corresponding error handling procedure (block 88). It is important to note that making the unobservable microgrid asset 15 internally unavailable to exclude it from the next optimization calculations will not solve the problem and may even exacerbate the situation. Thus, the control system 12 may commit other generation candidates while the unobservable online generation set is still serving the load; which may endanger the stability of the microgrid 10.

Further, the control system 12 may be configured to handle the uncontrollability errors detected during the validation of the readings derived from the microgrid assets 15 (block 88). Indeed, the control system 12 may be configured to handle errors for each type of uncontrollability error (e.g., uncontrollability type I, uncontrollability type II, uncontrollability type III, uncontrollability type IV, and uncontrollability type V) differently. In certain embodiments, handling the error may refer to a response or action taken to correct and/or account for the detected error in order to reduce any undesired effects of the detected errors. For example, for an identified uncontrollability type I error, the error is continuously or at a set interval checked after the time point C 68. The control system 12 may continue to send OFF command every 10 seconds, and continues to read from the microgrid asset 15 to see if the command is implemented. If microgrid asset 15 cannot be turned off by the time data are latched for the next optimal dispatch (the time point B 66 in the next time step 61), the control system 12 may be transferred to the Advisory mode. Additionally, if a microgrid asset 15 is offline and then becomes online, this error falls into the category of uncontrollability type I because the microgrid asset 15 may continue to receive the OFF command despite not turning OFF. Therefore, if the problem is not corrected by the next optimal dispatch (the time point B 66 or the time point B 66 in the next time step 61), the control system 12 may switch to Advisory mode. If such an event happens between the time point B 66 and the time point C 68, the same error handling procedure is applied. For example, if the microgrid asset 15 does not get turned off by the next optimal dispatch (the time point B in the next time step 61), the control system 12 may be switched to the Advisory mode. In certain embodiments, this error may activate an Incomplete Stop in the local controllers 34, and consequently the microgrid asset 15 becomes unavailable, and it will not be included in the next optimal dispatch. Since a sufficiently-sized microgrid generation asset 13 or storage device 26 may usually operate in isochronous/fast load-following mode, this error may not significantly endanger the stability of the microgrid 10. However, if it is not handled properly, it may lead to more sever errors/consequences in the next optimal dispatch 71. Thus, the next optimal dispatch 71 may result in committing additional generation sets while the uncontrollable microgrid asset 15 still contributes to power generation in the microgrid 10 which can endanger the stability of the microgrid 10. In case the isochronous generator or fast load-following storage device is not adequate to compensate for the extra power generation due to the uncontrollable (type I) device, an immediate remedial action is activated to stop appropriate number of online generators.

For the uncontrollability type II errors, the microgrid system 10 continues operating until the next optimal dispatch 71 within the next time step 61. Before latching data for the execution of the next optimal dispatch at the time point B 66 in the next time step 61, if the error persists and the microgrid asset 15 is available and observable, the control system 12 may generally make the asset 15 internally unavailable/disabled and may send an alarm; otherwise, only an alarm will be raised. In this manner, the microgrid asset 15 may be completely out of the optimization calculations until an operator fixes the problem and makes the microgrid asset 15 available/enabled. If this type of error occurs during the execution of optimization problem (i.e., between the time point B 66 and the time point C 68), no particular action may be undertaken as a proper decision may already have been made before latching data at the time point B 66. In certain embodiments, the uncontrollability type II errors may not be a major concern regarding the stable operation of the microgrid 10 due to the operation of a sufficiently-sized isochronous generator or fast load-following storage device. Generally, this type of error may lead to Incomplete Start and Unavailability of the microgrid asset 15, putting the microgrid asset 15 out of the optimization calculations in the next optimal dispatch 71. However, an alarm may be raised requiring the operator to fix the problem. In case the reserve margin provided by the isochronous generator or fast load-following storage device is not sufficient to compensate for the uncontrollable (type II) generator, a remedial action is activated to start and dispatch a replacement generator similar or close in size to the uncontrollable generator. For those microgrid applications where there are neither sufficient reserve margin nor replacement generators, a fast load shedding scheme should be initiated by the microgrid control system according to a priority list set by the user.

In certain embodiments, the complexity of the uncontrollability type II errors for the storage microgrid assets 15 (e.g., storage device 26) corresponds to their standby losses or self-discharge rate, leading to the infeasibility of the microgrid optimization problem. For example, the storage device 26 (e.g., charging) may continue to receive an ON command without turning ON, and its state of charge (SOC) reduces over time because of standby losses. When such an error is corrected by the operator and storage becomes available/enabled, the SOC read from the microgrid system 10 might have fallen below the minimum acceptable capacity, which makes the optimization problem infeasible. Such situations may be avoided by forcing "soft" constraints for the storage devices 26 to allow for small violations from the minimum acceptable capacity, as is further explained below with respect to FIG. 6. Accordingly, in some embodiments, the SOC is limited by a maximum capacity and a minimum acceptable capacity. Depending on various factors related to the storage technology, including considerations related to the life of the storage device 26, a maximum depth of discharge is usually recommended for the storage devices 26. The maximum depth of discharge may be around approximately 70%-80% of the maximum capacity. In other embodiments, the maximum depth may be 60%-70%, 80%-90%, and so forth. Accordingly, the minimum acceptable capacity cannot be usually less than 20%-30% of the maximum capacity.

In certain embodiments, a deviation from the minimum capacity may not be tolerated, as this is implemented by a lower-bound "hard" constraint. However, the SOC can be allowed to slightly deviate from the minimum acceptable capacity by defining a positive slack variable, which may be penalized in the objective function of the microgrid optimization problem. In this manner, the SOC may go below the minimum acceptable capacity by the small value of the positive slack variable decided by the microgrid control system. This is referred to as lower-bound "soft" constraint. Further, in certain embodiments, a parameter in the control system 12 may be provided to allow the user decide the type of "hard" or "soft" constraints for the storage devices 26. This parameter can be set to 0 or 1 to select "hard" or "soft" constraint, respectively. When Uncontrollability type II error is detected for the storage device 26, in order to eliminate the risk of optimization infeasibility, the soft constraint may be internally forced by the control system 12 even if a hard constraint is already set by the user.

In addition to the uncontrollability type II errors, the control system 12 may also handle detected uncontrollability type III errors. As noted above, handling an error may include an action or response taken by the microgrid control system 12 to correct and/or account for the detected errors. The uncontrollability type III errors correspond to operation-mode uncontrollability and may be checked for online generation sets or the storage devices 26. Due to criticality of this error, the control system 12 may immediately transfer to the Advisory mode and/or the Off mode when this type of error is detected. As noted above, in certain embodiments, the isochronous/fast load-following mode is validated by the control system 12 (block 82). In certain embodiments, if a discrepancy is detected between what is sent by the control system 12 and what is read from the microgrid system 10, the control system 12 may not stay in Auto mode, and may be switched to the Advisory mode and/or Off mode.

The control system 12 may also handle detected uncontrollability type IV errors. For the uncontrollability type IV errors, upon detection of a larger-than-expected discrepancy between power setpoint commands (e.g., commands or instructions within the optimal dispatch schedule) and actual readings from the microgrid 10, the control system 12 may not stay in Auto mode. The acceptable error margins can be set by the user in the control system 12. Additionally, for the uncontrollability type V errors detected, in order to prevent this undesired event from happening, the control system 12 operation mode and watchdog signals may be utilized in a logic within the local controllers 34 to block them if the control system 12 and communication pathway 36 are not operational or the control system 12 operation mode is not Auto mode.

Similarly, the control system 12 may be configured to handle the failure errors detected during the validation of the readings derived from the microgrid assets 15 (block 90). Indeed, the control system 12 may be configured to handle errors for each failure error (e.g., failure of a dispatchable generation set, failure of a storage device 26, failure of a renewable generation set, failure or tripping a load, or failure of the grid 23). For example, in handling the failure of a dispatchable generation set, the control system 12 may have two actions. In a first action, a remedial action may be first initiated. For example, this remedial action may include a replacement dispatchable generation set being implemented according to a priority list set by the user when the control system 12 is set up. In a second action, if the failed dispatchable generation set declares unavailable, no action will be needed at the next optimal dispatch 71, otherwise, the control system 12 may make it disabled/unavailable at the next optimal dispatch 71. The operator may take action to correct the problem and make the dispatchable generation set available or enabled.

In certain embodiments, the control system 12 may be configured to handle the failure of the storage devices 26. These types of errors may be more likely to occur when the storage device 26 is composed of several devices (e.g., the electrolyzer 28, the hydrogen storage 30, and the fuel cells 32). This error may happen for input (charging) of the storage device 26 and/or output (discharging) of the storage device 26. The control system 12 may utilize two actions when handling these types of errors related to storage devices 26, as will be further explained below with respect to FIG. 6.

In a first action, if the failed storage device 26 (input or output) is found to be unavailable, no action will be needed by the control system 12. However, depending on the value of the state of charge (e.g., SOC) of the storage device 26, the control system 12 may make the storage device 26 (input or output) disabled/unavailable at the next optimal dispatch 71. In such embodiments, an operator may correct the problem and make the storage device 26 (input or output) available or enabled. Considerations regarding the value of SOC for this error handling procedure will be discussed in detail below and with respect to FIG. 6. Further, in a second action, if the failure of the storage device 26 relates to storage input (charging) with non-zero standby losses, a soft constraint may be activated to allow a slight violation of the minimum acceptable capacity of the storage device 26 and to ensure the feasibility of the microgrid optimization problem. Apart from the violation of storage minimum capacity due to standby losses that may lead to infeasibility of the microgrid optimization problem, there are other practical complexities that may lead to the violation of both maximum and minimum storage capacity. For example, delay in issuing the charging/discharging commands, measurement errors, and startup or environmental conditions may lead to the violation of both maximum and minimum storage capacity of the storage device 26.

In some embodiments, the frequent charging and discharging (cycling) of the storage devices 26 around the maximum capacity and the minimum acceptable capacity may lead to undesired outcomes, such as, for example, infeasibility and cycling errors. These undesired outcomes can be avoided in the control system 12 by having pre-processing units and post-processing units outside of the optimization core of the control system 12. These units may modify the commands of the control system 12 or may modify input readings, such as those relating to the SOC. This may also include defining some regions around the maximum capacity and the minimum acceptable capacity.

Figure 6:
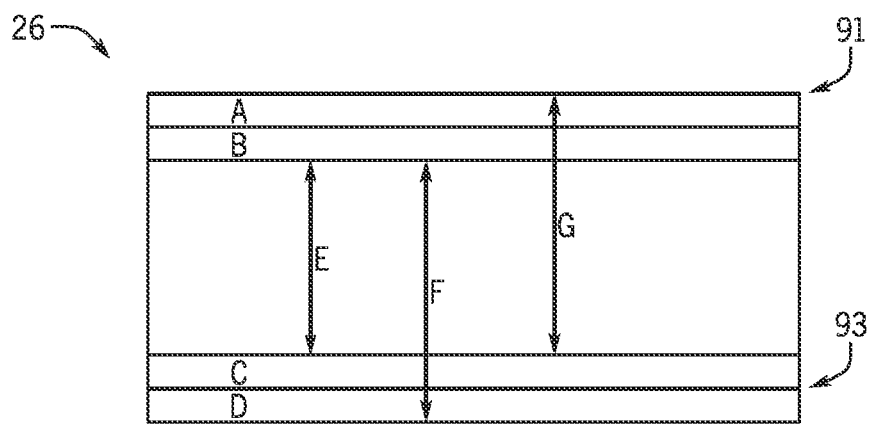
FIG. 6 is a block diagram of an embodiment of a storage device within the microgrid control system of FIG. 1, depicting a maximum storage capacity, a minimum acceptable storage capacity, and different state-of-charge regions for the storage device.

For example, FIG. 6 illustrates the state of charge (SOC) for the storage device 26, including a maximum storage capacity 91 and a minimum acceptable storage capacity 93. In particular, two regions below the maximum capacity 91 (e.g., A and B) and two regions on either side of a minimum acceptable capacity 93 (i.e., C, and D) are illustrated for the storage device 26. These regions may be a few percent or a small portion of the maximum storage capacity 91. In some embodiments, the region E represents the storage safe operational zone that requires no particular action. However, if the SOC is within any of four regions A, B, C, or D, the measured value of that region is appropriately changed together with forcing some necessary charging/discharging commands. For example, if the measured SOC lies in regions A or B, the value of the SOC is fixed at the maximum capacity 91 in the optimization model run in the control system 12. Likewise, if the measured SOC lies in region D, it is assumed to be the minimum acceptable capacity 93 in the optimization model to avoid infeasibility. In some embodiments, the storage device 26 may be forced to charge until the SOC reaches to region E.

In certain embodiments, certain occasions or events may be inappropriately treated as a failure of the storage devices 26. Thus, it is assumed that the storage device 26 is online and keeps charging. When it reaches the maximum capacity 91, the local controller 34 may set it in standby mode. In certain embodiments, this may be interpreted as a failure and therefore, in the next optimal dispatch 71, the input charging may be disabled in case of the input is available. Similarly, an online storage device 26 may reach the minimum acceptable capacity 93 due to discharging or standby losses. The local controller 34 for the storage device 26, in this case, may again set the device in standby mode. This may be mistakenly interpreted as a failure and therefore, in the next optimal dispatch 71, the output discharging may be disabled in case the storage output is available.

In order to handle these problems (i.e., undesired input or output disabling) and distinguish these events from real failures, the control system 12 may be configured to disable the input charging and output discharging so long as the SOC is sufficiently far from the maximum capacity 91 and the minimum acceptable capacity 93. For example, in certain embodiments, these states may be illustrated as regions F and G in FIG. 6, respectively. If a change of state from online to offline/standby happens while the SOC is located in region F, the control system 12 disables the input charging since this change of state is due to a real failure and not because the maximum capacity 91 is reached. Also, if a similar change-of-state event occurs while the SOC is located in region G, the control system 12 disables the output discharging since this event is due to a real failure and not because the minimum capacity 93 is reached.

As described with respect to the flow chart 70 in FIG. 5, the microgrid control system 12 may also handle the failure of a renewable generation set error. Upon detection of this error, depending on the microgrid application and size of the renewable generation set, a remedial action can be defined that may be initiated. Therefore, a replacement generation/storage device will be started according to a priority list set by the user. In this case, renewable generation set will be made internally disabled in the next optimal dispatch 71 and will remain disabled until its status changes to online. Renewable latched data in each dispatch time period (e.g., 12 minutes) may be used by the renewable forecast engine of the control system 12. During the failure period, forecast data may not be updated with zero values.

For the failure or tripping of a load, the control system 12 may handle the error by internally disabling the load in the next optimal dispatch 71, and similar to renewable generation sets, forecast data may not be updated with zero values during the failure period. If the load becomes online, the control system 12 makes it internally enabled. It is worth mentioning that a microgrid 10 can have multiple load connections, and the aforementioned error handling procedure is applicable upon detection of the failure for each load in the microgrid 10. For failure of the grid 23 connection, if the islanded mode of operation has been defined for the control system 12, this mode may be immediately activated upon grid 23 failure, otherwise the grid 23 may be internally disabled and the control system 12 may be transferred to the Off mode and/or the Advisory mode.

In this manner, the microgrid control system 12 handles different types of each detected error and/or undesirable event in different ways. Other types of errors may be detected and handled by the microgrid control system 12, such as, for example, infeasibility and unboundedness errors. The infeasibility and unboundedness errors may result when the optimization problem cannot be generated and/or solved during the microgrid optimization problem, as depicted in FIG. 4. For example, the infeasibility error refers to the infeasibility of the microgrid optimization problem generated at time point B 66 (FIG. 4), meaning that there is no solution that can satisfy all the optimization constraints and/or limitations. Further, the unboundedness error refers to the unboundedness of the microgrid optimal solution found in time window BC (FIG. 4), such that the microgrid optimization problem is feasible but the value of one or more decision variables in the optimal solution may not be a valid number (e.g., approaching infinity). In some embodiments, in handling these types of errors, the control system 12 may be switched to the Advisory mode at the time point C 68.

After the detected errors and/or undesirable events are handled, the process 70 included determining if the microgrid control system 12 is in an auto mode or an advisory mode. As noted above, when the microgrid control system 12 is in Auto mode, the microgrid optimization problem is solved and the optimal dispatch schedule (e.g., optimal dispatch solution) is communicated with the local controllers 34. When the microgrid control system 12 is in advisory mode, the microgrid optimization problem is solved, but the optimal dispatch schedule (e.g., optimal dispatch solution) is not communicated with the local controllers 34. If the microgrid control system 12 is in Auto mode, the control system 12 is configured to write commands/setpoints and generally write the optimal dispatch schedule (e.g., commands, instructions, or decisions) to the local controllers 34 (block 94).

In particular, the optimal dispatch schedule may occur at the optimal dispatch region 71 of the microgrid optimization process 54, and the optimal dispatch schedule may be transmitted to the local controllers 34. If the control system 12 is in advisory mode, the control system 12 may be configured to log the commands and setpoints (e.g., optimal dispatch schedule commands, instructions, decisions, etc.) within the memory component 50 for future access. In particular, regardless of whether the control system 12 is in auto mode or advisory mode, the optimal dispatch schedule determined at the end of the process 70 may be the result of removing the identified errors and/or undesirable events. Accordingly, the process 70 is configured to determine a dispatch schedule that is optimal based on available (e.g. non-error or valid) information, as it has determined and considered various errors before sending commands to the local controllers 34. At the end of the process 70, the read/write process 70 may be configured to begin again in the next time step 61, and the process 70 may once again cycle to determine, identify and handle various types of errors or undesired events.

Technical effects of the invention include a microgrid control system 12 configured to monitor the microgrid system 10 (e.g., microgrid assets 15) during execution of the optimal dispatch technique. In particular, the control system 12 is configured to identify different types of errors and/or undesirable events that may occur during phases of optimal dispatch technique, such as during reading, optimizing, writing, and implementing of the dispatch scheduling results. The types of errors identified may include unobservability (e.g., unobservability type I, unobservability type II), uncontrollability (e.g., uncontrollability type I, uncontrollability type II, uncontrollability type III, uncontrollability type VI, uncontrollability type V), failure errors (e.g., failure of a dispatchable generation set, failure of a storage device, failure of a renewable generation set, failure or tripping of a load, failure of the grid 23, etc.), infeasibility, and unboundedness. The control system 12 may be configured to handle these identified errors in different ways to minimize the detrimental effects of the errors on the stability and optimal operation of the microgrid 10. In particular, the process 70 of monitoring and handling the errors may be overlapped and/or embedded within the read/write process 70 of the microgrid optimization process 54 and may cyclically occur throughout the prediction horizon of the microgrid optimization.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for controlling a microgrid, comprising:
a processor-based control system configured to:
receive information via a communications pathway from a plurality of microgrid assets within a microgrid system;
identify an error associated with an operation of the microgrid system, the error comprising one of:
unobservability of a first one of the plurality of microgrid assets; and
uncontrollability of a first one of the plurality of microgrid assets;
generate an optimal dispatch schedule comprising one or more control signals configured to control the microgrid operation to improve an operational efficiency of the microgrid;
wherein, if the error is identified prior to generating the optimal dispatch schedule, the first one of the plurality of microgrid assets associated with the error is excluded from the generation of the optimal dispatch schedule; and
determine if the control system is in an auto mode or an advisory mode;
deliver, if the stem is in an auto mode, at least a portion of the optimal dispatch schedule via the communications pathway to a processor-based local controller associated with a second one of the plurality of microgrid assets, wherein an operation of the processor-based local controller is based at least in part on the portion of the optimal dispatch schedule; and
log, if the control system is in an advisory mode, the optimal dispatch schedule in a memory.

2. The system of claim 1, wherein the processor-based control system is configured to generate a solution to an optimization problem associated with the operation of the microgrid system, and wherein the solution to the optimization problem comprises the one or more control signals configured to control the microgrid operation to improve the operational efficiency.

3. The system of claim 2, wherein the optimal dispatch schedule is based at least in part on the solution to the optimization problem.

4. The system of claim 2, wherein the solution to the optimization problem is calculated in a plurality of cycles over a predetermined prediction horizon.

5. The system of claim 1, wherein the plurality of microgrid assets comprises a renewable generation resource, a non-renewable generation resource, a dispatchable generation resource, a non-dispatchable generation resource, a storage device, an industrial load, or a residential load.

6. The system of claim 1, wherein the processor-based local controller is configured to control the second one of the microgrid assets based on the portion of the optimal dispatch schedule received.

7. The system of claim 1, wherein, if the error is identified during generation of the optimal dispatch schedule, the control system is placed in advisory mode.

8. The system of claim 1, wherein the error is a first error that is identified prior to generation of the optimal dispatch schedule; and
wherein, if a second error is identified during generation of the optimal dispatch schedule, the control system is placed in advisory mode.

9. The system of claim 1, wherein the unobservability error is a loss of communication.

10. The system of claim 1, wherein uncontrollability error is one of:
an unsuccessful attempt in turning on or off a microgrid asset;
an unsuccessful attempt in changing an operation mode of a microgrid asset;
an undesired activation of local controllers; and
experiencing a large discrepancy between commands and actual readings from the microgrid.

11. The system of claim 1, the processor-based control system configured to deliver, if the error identified during generation of the optimal dispatch schedule is resolved, at least a portion of the logged optimal dispatch schedule via the communications pathway to a processor-based local controller associated with the microgrid asset.

12. The system of claim 1, the processor-based control system configured to validate a communications pathway between the control system and a local controller.

13. The system of claim 12, wherein determining an unobservability error is based on validating a communications pathway.

14. The system of claim 1, the processor-based control system configured to validate readings.

15. The system of claim 14, wherein determining an uncontrollability error is based on validating readings.

16. The system of claim 1, the processor-based control system configured to validate a mode of operation.

17. The system of claim 1, wherein the control system controls at least one of an operation of a local controller that controls the operation of the plurality of microgrid assets.

* * * * *